United States Patent [19] [11] 4,184,426
Oosterling et al. [45] Jan. 22, 1980

[54] BALING DEVICE FOR AGRICULTURAL CROPS

[75] Inventors: Pieter A. Oosterling, Nieuw-Vennep; Adriaan Van Zweeden, Rijsenhout, both of Netherlands

[73] Assignee: Expert N.V., Curacao, Netherlands Antilles

[21] Appl. No.: 7,998

[22] Filed: Jan. 31, 1979

Related U.S. Application Data

[63] Continuation of Ser. No. 848,525, Nov. 4, 1977, abandoned.

[30] Foreign Application Priority Data

May 11, 1976 [NL] Netherlands .......................... 7612345
May 13, 1977 [NL] Netherlands .......................... 7705350

[51] Int. Cl.² ............................................. B30B 15/32
[52] U.S. Cl. ................................... 100/100; 100/218; 100/250; 100/258 R
[58] Field of Search ................. 100/46, 187, 188, 249, 100/250, 251, 258 R, 218, 100; 214/82; 56/341–343

[56] References Cited

U.S. PATENT DOCUMENTS

| 235,542 | 12/1880 | Loesser | 100/250 |
| 406,680 | 7/1889 | Walter | 100/250 |
| 1,469,689 | 10/1923 | Prius | 100/258 R |
| 2,670,676 | 3/1954 | Green | 100/258 R |
| 2,775,930 | 1/1957 | Anderson et al. | 100/250 X |
| 3,802,335 | 4/1974 | Longo | 100/250 |
| 3,821,929 | 7/1974 | Stapf | 100/179 |

Primary Examiner—Peter Feldman
Attorney, Agent, or Firm—John P. Snyder

[57] ABSTRACT

A compressive chamber of a baling device is open at both ends. Associated with one end is a movable closure member and a ram projects into the chamber from the opposite end. Drive mechanism directly connects the ram and the closure member so that in one direction of drive the closure member is forced into and held in closed position while the ram travels toward it and, in the opposite direction of drive, the ram and closure member are forced apart to unseat the closure member and move it to open position.

18 Claims, 7 Drawing Figures

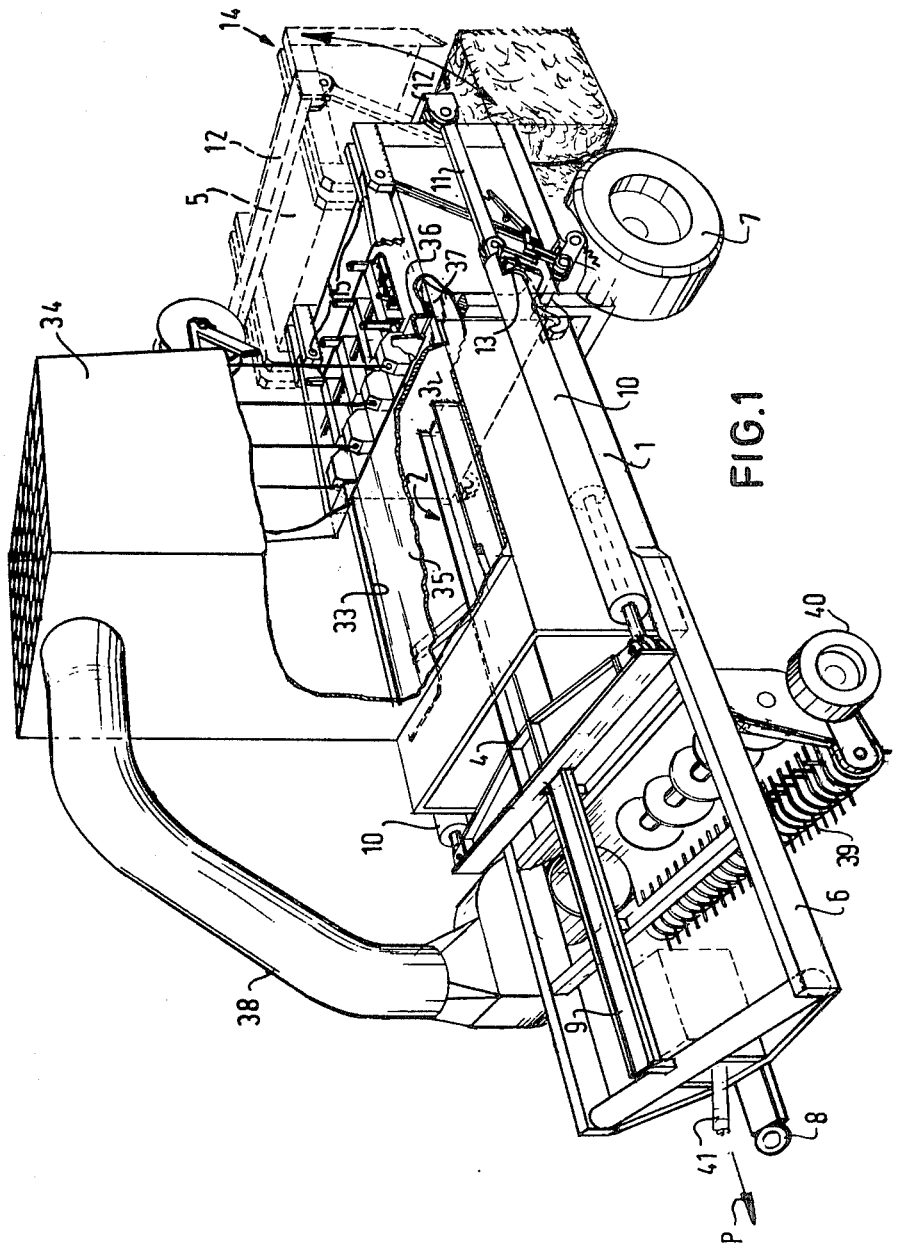

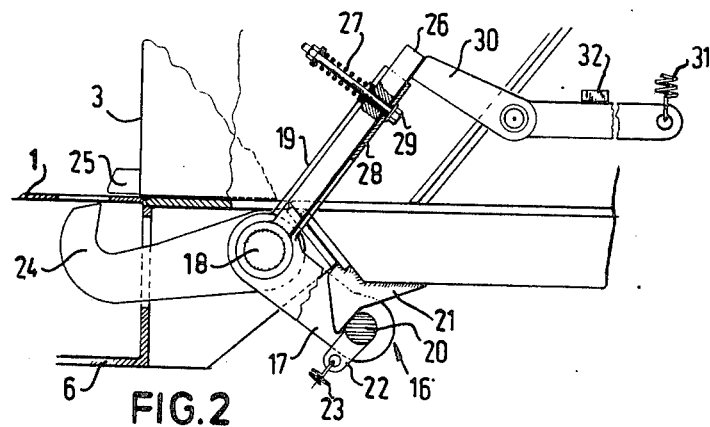
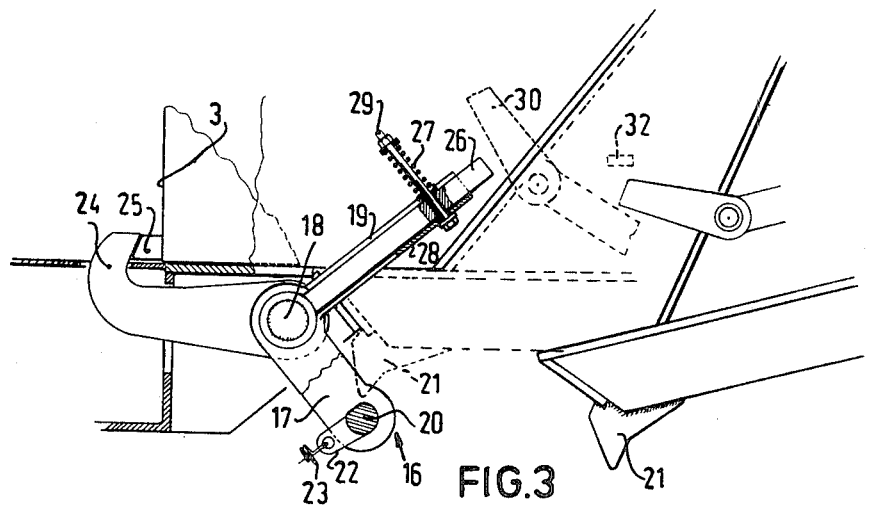

BALING DEVICE FOR AGRICULTURAL CROPS

This is a continuation, of application Ser. No. 848,525 filed Nov. 4, 1977, now abandoned.

The invention relates to a device for baling agricultural crop comprising a compression chamber and a drive ram adapted to reciprocate therein.

The invention has for its object to provide a baling device which is particularly suitable for producing bales having a high specific weight, which means that large quantities of agricultural crop are compressed into comparatively small bales. A problem involved is that high pressing forces are required, which again requires a rugged construction.

An object of the invention is to provide a less heavy contsruction of the baler. The device according to the invention is characterized in that the driving gear for the ram extends freely outside the compression chamber and is connected on the one hand with the ram and on the other hand with the end wall of the compression chamber located opposite the ram.

It has been found that in compressing agricultural crop the higher forces occur in the direction of compression rather than at right angles thereto. Therefore, the construction of the compression chamber and of the frame stiffening said compression chamber may be light, since the pressing forces produced by the drive are exerted directly through the end wall and through the ram on the bale.

In a further development of the invention the end wall is included in a portion adapted to pivot with respect to the compression chamber in order to form a delivery port for discharging the ready bale. With regard to hinge and locking mechanism this pivotable portion may be of a comparatively light structure, since the forces occurring in these structural parts are slight.

It is advantageous in this case to use locking members for locking the ram in its pressing state. Owing to these locking members the pivotable end part can be opened or closed by the drive of the ram.

Further the invention has for its object to provide a baling device which is particularly suitable to form bales of high specific weight, that is to say, that large quantities of agricultural crop are compressed into comparatively small bales. This requires comparatively high pressing forces. A problem involved in such a device is that the crop does not behave like a fluid so that the load on the ram with respect to the pressing surface is quite irregular. This irregularity may result in the ram being pulled readily out of square in the baling chamber. This problem is particularly important when more than one hydraulic driving cylinders are used.

The object of the invention is to provide such a drive of the ram that the risk of the ram getting out of square in the compression chamber is eliminated.

The device according to the invention is distinguished by means for the relative synchronization of the cylinder speeds.

The synchronizing means may be hydraulic, pneumatic, electric or mechanical means.

In a mechanical embodiment the invention proposes to provide the synchronizing means with a torsional shaft extending transversely of the direction of movement and carrying a member rigidly secured thereto and following the movements of the cylinder. Owing to this mechanical linkage between the cylinders each difference in speed of the cylinder will be immediately corrected by the torsional shaft.

In a preferred embodiment the follow-up member is constructed in the form of a gear wheel rolling along a toothed rack connected with the baling chamber, the torsional shaft being journalled in a part connected with the ram.

Further features and advantages of the invention will become apparent from the following description of some embodiments.

In the drawing

FIG. 1 is a perspective view of the baling device embodying the invention, wall portions of the collecting chamber and compression chamber being broken away, FIGS. 2 and 3 two detailed elevational views of the locking and closing mechanism for the conveying member and the pivotable end portion of the compression chamber respectively.

Figure 4:
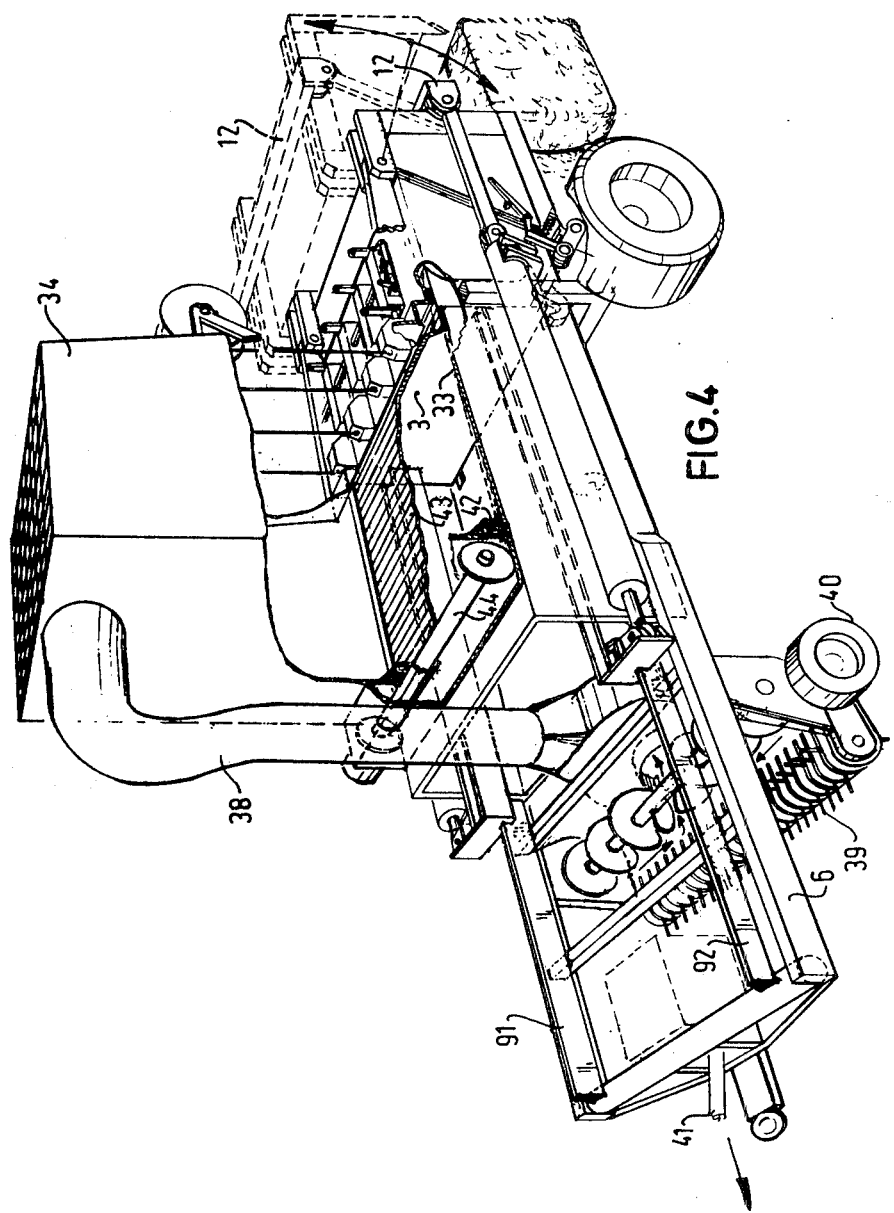
FIG. 4 shows a variant of a mobile baling device.

The mobile baler shown in FIGS. 1 to 4 mainly comprises a horizontal compression chamber 1, in which a ram 2 is adapted to reciprocate. The ram mainly comprises a pressing plate 3 corresponding to the cross-section of the compression chamber 1 and being fastened to the end of a T-shaped pressing body 4. The compression chamber 1 mainly comprises two longitudinal sidewalls, a top wall and a bottom wall interconnected at the right-hand top end in FIG. 1 by a closed end wall 5.

The pressing chamber 1 is supported by a frame 6 bearing at the rear end on a set of ground-engaging wheels 7. At the front end the frame 6 is provided with a draw ring 8 for attachment to, for example, an agricultural tractor. The frame furthermore holds a guide path 9 extending in the direction of length, on which the pressing body 4 of the ram 2 is slidably supported.

According to one aspect of the invention the driving gear for the ram 2 is arranged outside the compression chamber 1, that is to say in the embodiment shown, between the ends of the top part of the T-shaped pressing body 4 and the end wall 5. The driving gear comprises in this case two hydraulic cylinders 10, disposed one on each side of the compression chamber 1, the piston rods of which are fastened to the pressing body 4, whereas the other end of the cylinder is pivoted through a coupling rod 11 to a stiffening beam 12 associated with the end wall 5. Near the coupling rod 11 the cylinger 10 is supported by a seat 13 fastened to the sidewall of the compression chamber 1.

The end wall 5 of the compression chamber 1 forms part of a pivotable end portion 14, which is coupled in this case with the compression chamber 1 so as to be upwardly pivotable about two hinges 15. The end portion furthermore comprises a part of the sidewalls and bottom and top walls respectively at right angles to the end wall 5.

The end portion 14 can be locked in the closed position by means of locking means 16 shown in detail in FIGS. 2 and 3. Said locking means are formed by one or more brackets 17 adapted to turn about a common shaft 18 and to be turned by means of a lever 19 fastened at an angle to the bracket 17. At the end remote from the shaft 18 the brackets 17 have a pin 20 co-operating with a lug 21 fastened to the pivotable portion 14. The bracket 17 is biassed by means of an eyelet 22 fastened to the pin 20 and a spring 23 coupled herewith in clockwise direction as indicated in FIGS. 2 and 3.

About the same common shaft 18 are pivotable lock bolts 24, which co-operate with a lug 25 on the rear side of the pressing plate 3. These lock bolts serve to lock the ram 2 in the pressing state, the function of which will be explained more fully hereinafter. The pressing state of the ram 2 is illustrated in FIG. 1 as well as in FIGS. 2 and 3. The lock bolt 24 is turned by means of a control-lever 26 extending parallel to the control-lever 19 of the bracket 17. The lever 26 is urged by a compression spring 27 against a stop 28 fastened to the lever 19 because the other end of the spring 27 bears on a nut screwed onto a bolt 29, the head of which is in engagement with the stop 28. The lever 26 is guarded by a locking pawl 30, which is pivoted to the pivotable end portion 14 of the compression chamber and being actuable by means of suitable control-members 31. The control-members 31 are formed in this case by a biassing spring urging the pawl 30 against a fixed stop 32.

The top wall of the compression chamber 1 has a port 33, the circumference of which corresponds with the circumference of a collecting chamber 34 arranged on the compression chamber 1. The inlet port 33 can be closed by an element 35, which is connected with the pressing plate 3.

The wall of the collecting chamber 34 facing the end wall 5 or the pivotable end portion 14 has a stepped structure just above the inlet port 33, the steps projecting inwardly (see reference numeral 36). At the transition between the front wall and top wall of the compression chamber 1 a cutter 37 co-operates with the top edge of the pressing plate 3 for cutting long stems of crop to be compressed.

The collecting chamber 34 is fed by an elevating mechanism 38 receiving the crop from a pickup mechanism 39 of known construction. The pick-up mechanism is independent in a vertical sense with respect to the frame 6 by means of the wheels 40.

The actuation of the various rotatable and movable elements is obtained in this embodiment from the power take-off shaft 41 of the tractor at the front of the frame 6.

The device operates as follows. The device is run in the direction of the arrow P across the field, the pick-up mechanism 39 raking up the mown crop, for example, grass and conveying it via the worn conveyor to the elevator mechanism 38, from which the crop is fed into the collecting chamber 34. In the starting position the ram is completely slid out of the compression chamber 1 so that the pressing body 4 is located at the left-hand bottom end of the guide 9. The inlet port 33 is released because the locking element 35 is displaced to the left with the pressing plate 3. Thus the crop enters the compression chamber 1. After a given time the cylinder 10 on either side of the compression chamber 1 is energized so that the ram 2 moves to the rear and compresses the crop in the compression chamber 1. During this movement the element 35 will shut the inlet port. Excessively long tailings are cut off by the cutter 37 and the pressing plate 3. The step structure 36 prevents accumulation of crop so that cutting can be performed without requiring much energy. Feeding and compressing of the crop may take place in a few cycles until a sufficient quantity of crop for a desired bale is received in the rear part of the compresssion chamber 1.

During the compression the pivotable end potion 14 is closed, that is to say, the closing mechanism 16 occupies the position illustrated in FIG. 2.

When a sufficient quantity of crop is compressed into a bale and when this bale is fixed by binding means of some kind, the pawl 30 can be lifted by turning it in clockwise direction (FIG. 2.), so that it gets into the position indicated by dots in FIG. 3. The bracket 17 will instantly be turned by the spring 23 in clockwise direction, the lug 21 being thus released. The control-lever 19 will catch the lever 26 owing to the bias pressure of the spring 27. Thus the lock bolt 24 turns in clockwise direction and will hook behind the lug 25 of the pressing plate 3. Then the pivotable end portion 14 is unlocked and the pressing plate 3 or the ram 2 is locked. By energizing the cylinders 10 in the reverse sense, the cylinder 10 will move to the right in FIG. 1 owing to the locked state of the piston with respect to the compression chamber 1 so that the pivotable end portion 14 will turn upwardly about the hinges 15, which is enabled by the hinge portion 11 between the cylinder 10 and the supporting beam 12. The reactive force in a vertical sense on the cylinder 10 is absorbed by the seat 13.

After the ready bale has dropped out of the compression chamber 1, the actuation of the cylinder 10 is reversed, the portion 14 swings back, the pawl 30 butts against the lever 26 so that the lock bolt 24 turns back and unlocks the ram 2 and the bracket 17 also turns back into the locking position. At the approach of the lug 21 the bracket 17 can yield against the force of the spring 27 until the pin 20 snaps behind the lug 21. The device is then ready for the next pressing run.

FIG. 4 shows an alternative embodiment of the baling device, which is distinguished from the embodiment shown in FIG. 1 by a centrally arranged elevator mechanism 38. This central disposition is enabled by splitting up the guide path 9 of the ram 2 into two rails 91 and 92. In this embodiment the worm conveyor of the elevator mechanism is formed by two portions having opposite pitches.

A further difference resides in that the closing element of the inlet port 33 is formed herein by a flexible mat 43. The mat is wound up around a spindle 44 as soon as the ram 2 moves to the right. A brush 42 on the mat 43 serves for keeping the top side of the coil clean so that winding will not be disturbed.

Figure 5:
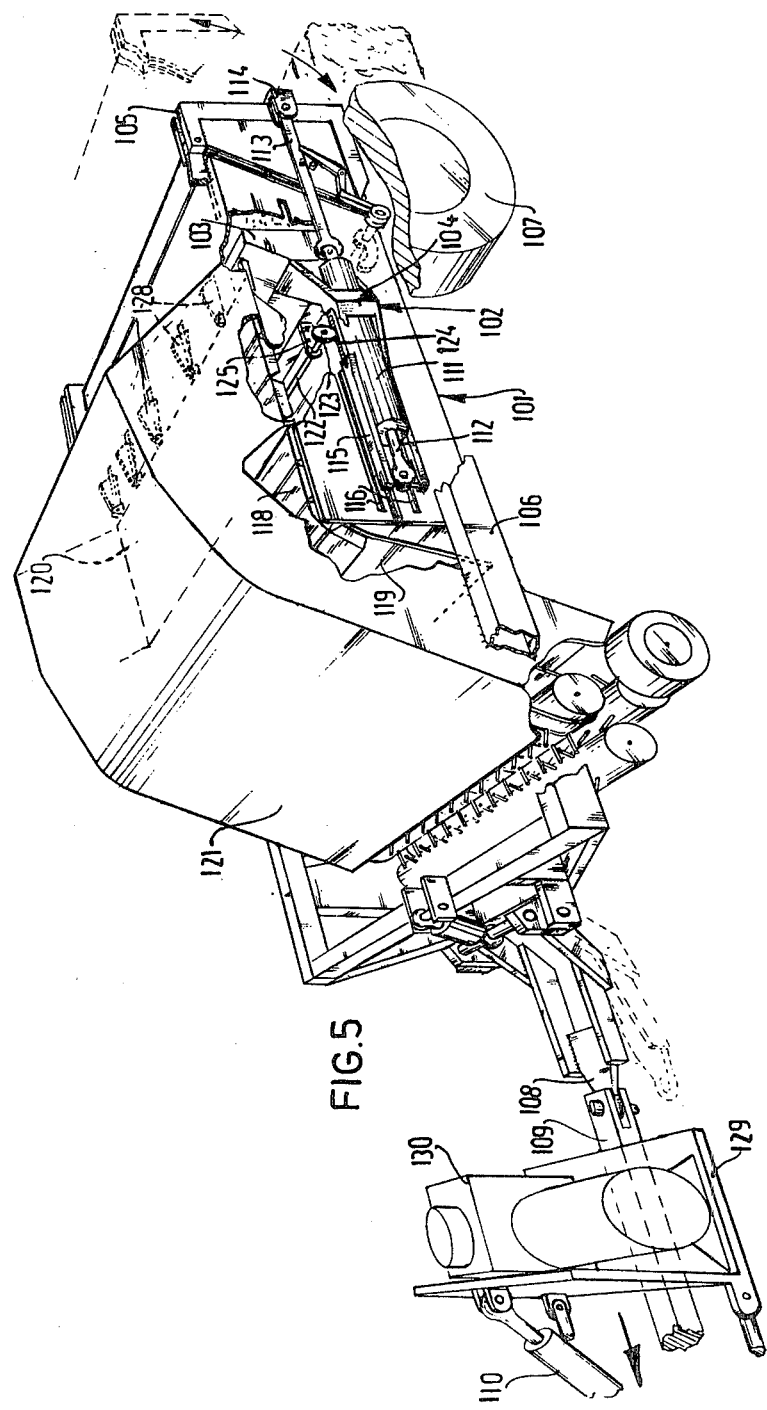
FIG. 5 is a perspective front view of a further embodiment of the device.
Figure 6:
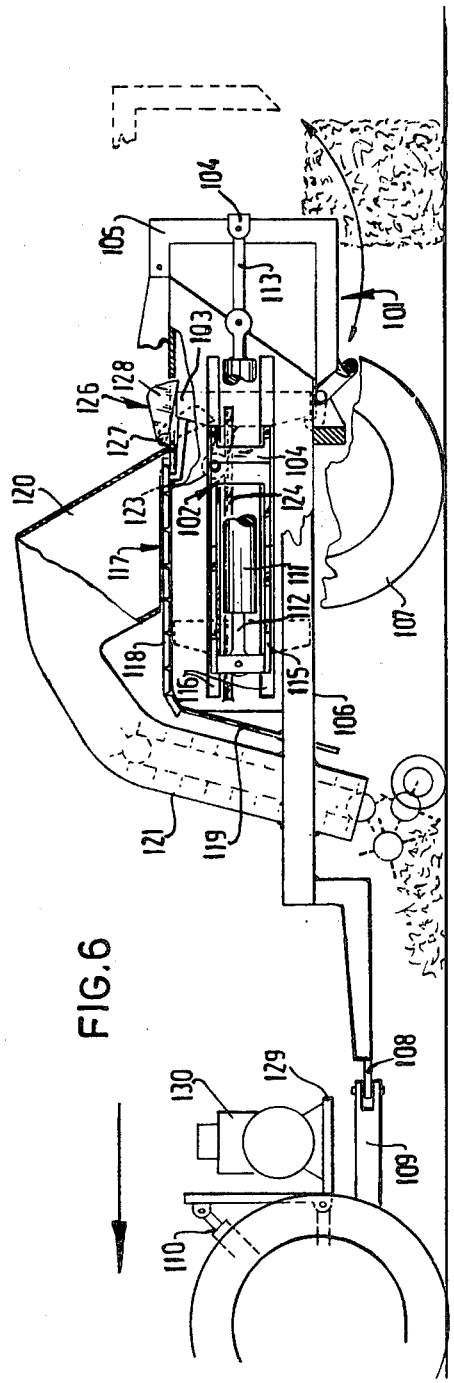
FIG. 6 is a longitudinal sectional view of the device shown in FIG. 5.
Figure 7:
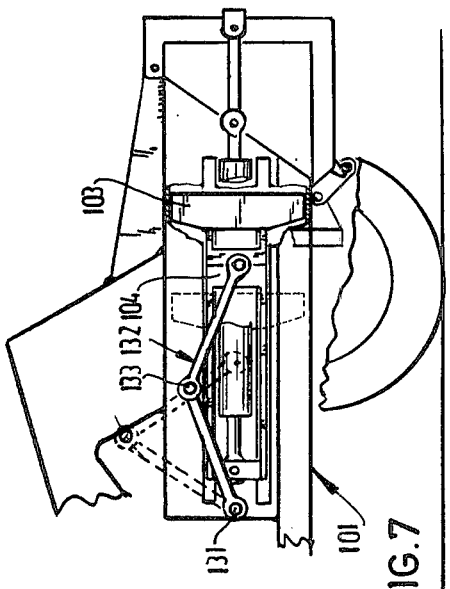
FIG. 7 is an alternative embodiment of the synchronizing means in the baling device.

The mobile baling device shown in FIGS. 5 to 7 mainly comprises a horizontal baling chamber 101, in which a ram 102 is adapted to reciprocate. The ram 102 mainly comprises a pressing plate 103 corresponding to the cross-section of the baling chamber 101 and provided on either side with a pressing body 104 passed through the sidewall of the baling chamber 101. Apart from said sidewalls the baling chamber 101 comprises a top wall and a bottom wall interconnected at the right-hand top end in FIG. 5 by a closed end wall 105.

The baling chamber 101 is supported by a frame 106 supported on the rear side by a set of ground wheels 107. At the front end the frame is provided with a draw ring 108 for attachment to, for example, an agricultural tractor. Of this agricultural tractor only the tool bar 109 and the three-point suspension 110 are shown.

The ram is driven in the embodiment shown by two cylinders 111 extending outside the baling chamber 101 along the sidewalls thereof, the piston rods 112 engaging the free end of the pressing body 104 and the closed head walls of the cylinder being connected through a coupling rod 113 with a bracket 114 around the closed end wall 105. From the Figures it will be apparent that the cylinder 111 is arranged between two parallel elements 115 of a pressing body, said elements 115 being adapted to slide to and fro through slots 116 in the sidewall of the compression chamber 101.

The Figures show the ram in the extreme final position of pressing state so that when the cylinder 111 is energized the ram is moved forwards, viewed in the direction of travel, into the position indicated in FIG. 7 by broken lines. During this movement the ram moves along an inlet port 117 in the top side of the baling chamber which port can each time be closed by a screen 118 coupled with the pressing plate. When the ram retreats, the screen slides with the pressing plate along a guide 119 (see FIG. 6).

Above the inlet port 117 is arranged an auxiliary chamber 120, in which crop picked up from the soil and carried upwards by the elevator mechanism 121 is temporarily stored during the performance of a pressing cycle by the ram. When the ram is withdrawn and the inlet port 117 is released by the screen 118 the temporarily stored crop in the chamber 120 will each time get in front of the pressing plate 103. During the next pressing cycle this crop is again compressed.

According to the invention the rates of movement of the two cylinders are relatively synchronized in order to avoid the pressing plate running out of truth in the baling chamber. For this purpose a torsional shaft 122 extends transversely of the direction of movement and is passed by both ends through the upper slot 116 in the sidewall of the compression chamber. The two ends are provided with a rigidly secured follow-up member 123 formed by a gear wheel. This gear wheel rolls down a toothed rack 124 secured to the outer side of the sidewall of the compression chamber. The torsional shaft 122 is journalled in a part 125 fastened to the pressing plate 103.

It will be obvious that by this synchronization any departure from the path of movement of the cylinders 111 relative to one another is avoided, and/or in the event of a larger displacement of one cylinder with respect to the other the pressing body 104 and hence the part 125 secured to the pressing plate will also shift more in place accordingly. This results in a turn of the pinions 123 relative to one another so that the torsional stress produced in the torsional shaft will counteract any deviation in movement.

In the embodiment shown the top wall of the baling chamber 101 is provided with a plurality of retaining members 126 formed by a plate 128 adapted to turn about a shaft 127. The plate can drop down through a slot provided in the top wall of the baling chamber so that crop once compressed and tending to rebound when the pressing plate retreats, is retained by the plates 128 penetrating into the crop.

From the Figures it will be seen that the retaining members are arranged approximately near the end or pressing position of the ram 102 above the pressing plate, so that an optimum effect of the retainers is ensured. Nevertheless owing to their pivotable structure the plates 128 can be readily removed by the pressing plate 103 out of the baling chamber so that they will not hamper the supply of fresh crop to be compressed.

With the three-point suspension 110 of the agricultural tractor is coupled an auxiliary frame 129 carrying a hydraulic pressure source 130. This pressure source communicates through flexible conduits (not shown) with all hydraulic users of the device. The pressure source is driven by the power take-off shaft of the agricultural tractor.

FIG. 7 shows an alternative embodiment of the synchronizing means. Like the torsional shaft 122 a shaft 131 is passsed transversely of the direction of movement of the pressing plate 103 across the baling chamber and journalled in the sidewalls of the baling chamber. The two ends of the shaft 131 protruding out of the baling chamber 101 have firmly secured to them a follow-up member 132 formed in this embodiment by a scissor-like structure having apart from a central pivot 133 or pivotal joint with the pressing body. Obviously, when the ram 102 is withdrawn into the position indicated in FIG. 7 by broken lines the scissors will also arrive at the position indicated by broken lines. Any deviation from the rates of movement of the pressing body on either side of the baling chamber results in a different angular position of the scissor structure, which difference in angular position is counteracted by the torsional stresses produced in the shaft 131.

Within the scope of the invention other structural solutions may, of course, be imagined. For, for example, the cylinders 111 need not be arranged on the outer side of the compression chamber, they may be mounted at any other suitable area.

The retaining member 128 may also be constructed in a different way; for example, parts of the baling chamber wall may be rendered pivotable inwardly about a shaft. Moreover, pins slipping through the baling chamber wall may be used rather than pivotable members. If desired, the retainers 128 may be arranged in other walls of the baling chamber rather than the top wall thereof.

What is claimed is:

1. A device for compressing agricultural crop comprising in combination:

a compression chamber having an inlet for filling same with crop and a pivotal end portion being selectively operable between opened and closed positions to define an outlet port;

a compressing ram adapted to reciprocate longitudinally within said compression chamber toward and away from said pivotal end portion;

feed means for conveying crop through said inlet into said compression chamber when said ram is disposed away from said pivotal end portion; and relatively reversable free floating drive means extending longitudinally along the exterior of said compression chamber, said drive means being attached at one end to said ram and linkage means attaching the other end of said drive means to said pivotal end portion, whereby actuation of said drive means in one direction urges said ram and said pivotal end portion toward one another thereby pulling said ram through said compression chamber to compress said crop against said pivotal end portion and whereby upon reversal of said drive means said ram and pivotal end portion are urged apart to swing said pivotal end portion to open position.

2. A device as defined in claim 1 wherein said pivotal end portion comprises a generally vertical end wall and a generally horizontal bottom onto which said compressed crop is disposed whereby upon pivoting said end portion to the open position said bottom assumes a substantially vertical position allowing said compressed crop to drop freely from said outlet port.

3. A device as defined in claim 1 including selectively operable locking means for securing said ram adjacent said pivotal end portion to insure full reactive potential of said drive means thereagainst while pivoting said end portion to the open position.

4. A device as defined in claim 1 wherein said drive means comprises at least one hydraulic piston/cylinder and said compression chamber has guide means disposed thereon which prevents said piston/cylinder from becoming angularly displaced.

5. A device as defined in claim 4 wherein said drive means comprises a pair of hydraulic piston/cylinders extending longitudinally on opposite sides of said compression chamber and wherein each of said piston/cylinders is provided with said guide means.

6. A device as defined in claim 5 wherein means is provided for the relative synchronization of of the rates of movement of said piston/cylinders.

7. A device as defined in claim 6 wherein said synchronization means comprises a torsional shaft extending transversely of the direction of movement of said piston/cylinders, said torsional shaft having following members secured thereto which follow the movement of said piston/cylinders.

8. A device as defined in claim 7 wherein each of said following members comprises a gear wheel which rolls along a toothed rack secured to the compression chamber, said torsional shaft being journalled in a portion of said ram.

9. In a baling device, the combination of:
a horizontally elongate chamber having its opposite ends open, an end closure member disposed at one end of said chamber for movement between closing and open positions relative thereto;
a ram projecting into said chamber through that open end therof opposite said closure member;
reversible drive means acting between said ram and said closure member for selectively urging said ram and said closure member toward each other whereby the closure member is forced into closed position against said one end of the chamber while the ram travels toward the closure member in response to operation of said drive means in one direction and for urging said ram and said closure member away from each other to move said closure member to open position in response to operation of said drive means in the opposite direction; and
means for feeding the material to be baled into said chamber between said ram and said closure member.

10. In a baling device as defined in claim 9 wherein said drive means comprises a pair of extensible/retractable members exteriorially straddling said chamber, said members being connected at one end to said ram and at their other end to said closure member and being shiftable relative to said chamber.

11. In a baling device as defined in claim 10 wherein said closure member is pivotally connected to said one end of the chamber and wherein said drive means includes links connecting said opposite end of said members to said closure member, said links being connected to said closure member in offset relation to its pivotal connection to said chamber, and including saddle means for allowing said members to slide longitudinally relative to said chamber and to react thereagainst when the closure member is swung to open position.

12. In a baling device as defined in claim 11 wherein said members are double acting piston/cylinder assemblies.

13. In a baling device as defined in claim 9 including latching means for fixing said ram relative said chamber when said drive means is operated in said opposite direction whereby to move said closure member without movement of the ram.

14. In a baling device as defined in claim 10 including latching means for fixing said ram relative said chamber when said drive means is operated in said opposite direction whereby to move said closure member without movement of the ram.

15. In a baling device as defined in claim 11 including latching means for fixing said ram relative said chamber when said drive means is operated in said opposite direction whereby to move said closure member without movement of the ram.

16. In a baling device as defined in claim 12 including latching means for fixing said ram relative said chamber when said drive means is operated in said opposite direction whereby to move said closure member without movement of the ram.

17. In a baling device as defined in claim 9 wherein said closure member includes a platform portion which defines the bottom wall of said chamber when the closure member is in closed position, whereby movement of said closure member to open position transports a bale outwardly from said chamber.

18. A mobile baler device for compressing agricultural crop comprising in combination:
a mobile frame adapted to travel over a field and including a compression chamber having an inlet for filling same with crop and a pivotal end portion being selectively operable between opened and closed positions to define an outlet port;
a compressing ram adapted to reciprocate longitudinally within said compression chamber toward and away from said pivotal end portion;
feed means for conveying crop through said inlet into said compression chamber when said ram is disposed away from said pivotal end portion; and
drive means connecting said ram to said end portion of the compression chamber for compressing crop therebetween, said drive means comprising a pair of hydraulic piston/cylinders extending longitudinally on opposite sides of said compression chamber and externally thereof.

* * * * *